US009212769B2

(12) United States Patent
Rigollet et al.

(10) Patent No.: US 9,212,769 B2
(45) Date of Patent: Dec. 15, 2015

(54) CLAMP HAVING JOGGLES

(75) Inventors: Nicolas Rigollet, Romorantin (FR);
Fabrice Prevot, Selles sur Cher (FR);
Arnault Jacquelin, Mur de Sologne
(FR); Eric Mesnard, Tours en Sologne
(FR)

(73) Assignee: ETABLISSEMENTS CAILLAU, Issy
les Moulineaux (FR)

( * ) Notice: Subject to any disclaimer, the term of this patent is extended or adjusted under 35 U.S.C. 154(b) by 260 days.

(21) Appl. No.: 13/806,357

(22) PCT Filed: Jun. 20, 2011

(86) PCT No.: PCT/FR2011/051405
§ 371 (c)(1),
(2), (4) Date: Mar. 6, 2013

(87) PCT Pub. No.: WO2011/161364
PCT Pub. Date: Dec. 29, 2011

(65) Prior Publication Data
US 2013/0160247 A1    Jun. 27, 2013

(30) Foreign Application Priority Data
Jun. 23, 2010 (FR) ...................................... 10 54984

(51) Int. Cl.
*F16L 33/10* (2006.01)
*F16L 23/08* (2006.01)

(52) U.S. Cl.
CPC .................. *F16L 23/08* (2013.01); *F16L 33/10* (2013.01); *Y10T 24/1427* (2015.01)

(58) Field of Classification Search
CPC ....... F16L 23/08; F16L 33/10; Y10T 24/1427

USPC ..................................... 24/16 R, 274 R, 20 R
See application file for complete search history.

(56) References Cited

U.S. PATENT DOCUMENTS

| 554,446 | A | * | 2/1896 | Jones ................................ 24/30 |
| 1,467,708 | A | * | 9/1923 | Cooper ........................... 24/282 |
| 1,559,049 | A | * | 10/1925 | Rutledge ........................... 24/22 |
| 1,999,683 | A | * | 4/1935 | Borresen ......................... 24/275 |
| 4,275,484 | A | * | 6/1981 | Irio et al. ........................ 24/20 R |
| 4,299,012 | A | * | 11/1981 | Oetiker .............................. 24/19 |
| 4,315,348 | A | * | 2/1982 | Oetiker ..................... 24/20 CW |
| 4,521,940 | A |   | 6/1985 | Oetiker |

(Continued)

FOREIGN PATENT DOCUMENTS

| FR | 2305625 | 10/1976 |
| FR | 2522086 | 8/1983 |

*Primary Examiner* — Victor Batson
*Assistant Examiner* — David Upchurch
(74) *Attorney, Agent, or Firm* — Hamre, Schumann, Mueller & Larson P.C.

(57) ABSTRACT

The clamping collar comprises a metal belt (10), two tightening lugs (12, 14), and a bridging plate (20) for bridging the gap between the lugs. The belt includes an overlap portion (22) that has its inside face provided with a setback (24) into which a first end (20A) of the plate penetrates during tightening of the collar. The setback is defined by a first joggle (26) having an end wall that forms two surfaces on either side of the longitudinal midline of the belt, which surfaces are disposed substantially symmetrically about said midline, and are inclined both relative to the longitudinal direction and relative to the transverse direction of the belt, and each of which surfaces extends over a substantial fraction of the half-width of the belt.

21 Claims, 4 Drawing Sheets

(56) References Cited

U.S. PATENT DOCUMENTS

| | | | |
|---|---|---|---|
| 4,724,583 A * | 2/1988 | Ojima | 24/20 R |
| 4,750,242 A * | 6/1988 | Calmettes et al. | 24/20 R |
| 4,803,758 A * | 2/1989 | Calmettes | 24/20 R |
| 5,111,555 A * | 5/1992 | Oetiker | 24/20 R |
| 5,191,683 A | 3/1993 | Ojima et al. | |
| 5,208,949 A * | 5/1993 | Calmettes et al. | 24/20 R |
| 5,216,783 A * | 6/1993 | Calmettes et al. | 24/20 R |
| 5,282,295 A * | 2/1994 | Oetiker | 24/20 R |
| 5,305,499 A * | 4/1994 | Oetiker | 24/20 R |
| 5,548,872 A * | 8/1996 | Oetiker | 24/20 CW |
| 5,918,350 A * | 7/1999 | Detable et al. | 24/20 TT |
| 6,240,603 B1 * | 6/2001 | Craig, Jr. | 24/20 CW |
| 6,560,823 B1 * | 5/2003 | Craig, Jr. | 24/19 |
| 6,860,527 B2 * | 3/2005 | Wagner et al. | 285/420 |
| 2002/0104197 A1 * | 8/2002 | Craig, Jr. | 24/20 R |
| 2005/0039306 A1 * | 2/2005 | Logan et al. | 24/19 |
| 2008/0155795 A1 * | 7/2008 | Craig | 24/20 R |

* cited by examiner

CLAMP HAVING JOGGLES

The present invention relates to a clamping collar comprising a metal belt, two spaced-apart tightening lugs connected to the belt and suitable for being brought towards each other in order to tighten the collar, and a bridging plate that co-operates with the belt to bridge the gap between the lugs, the belt including an overlap portion that carries the first tightening lug and that has its inside face provided with a setback into which a first end of the plate penetrates during tightening of the collar.

This type of clamping collar is known, as applied to collars having belts that are flat, from Document FR 2 522 086.

In such a known collar, the bridging plate is terminated by a narrow tongue and, in the inside face of the belt, the setback forms a narrow channel into which said tongue penetrates. The tongue has longitudinal sides that are of long length, and it is connected to the remainder of the plate via transverse faces, i.e. faces extending perpendicularly to the longitudinal direction of the belt. Similarly, the channel formed by the setback has longitudinal sides that are of long length. The channel and the tongue are substantially centered on a longitudinal midline of the belt, and each of them is of small width, as measured transversely relative to the longitudinal direction, that represents approximately in the range one quarter of the width of the belt to one third of the width of said belt.

When the collar is tightened, the tongue is received in the channel and, since the depth of that channel corresponds substantially to the thickness of the tongue, the inside face of the collar offers substantially continuous bearing against the article that is clamped by the collar. In the region of the tongue, that bearing continuity is offered firstly by the marginal portions of the belt that are situated on either side of the channel in a transverse direction and secondly by the inside face of the tongue. This bearing continuity is important for certain applications, in particular when the article that is clamped by the collar is an interconnection zone in which two ducts or two tubes, or indeed a pipe and an end-piece, are connected together, and in which zone leaktightness is desired.

Increasingly, the performance that is expected of clamping collars is high, in particular as regards the clamping forces required to obtain excellent leaktightness.

At the same time, savings are being sought, so that endeavors are being made to use as little material as possible to form the belt. In other words, the thickness of the belt is often relatively small. However, belts of small thickness tend to deform in undesired manner under the effect of the large clamping forces involved, it being possible for such deformation to give rise to degradation in the quality of the clamping and in the quality of the leaktightness. Thus, with the above-mentioned constraints, endeavors are being made to use stiff belts that, with little material, are capable of withstanding large clamping forces.

An object of the present invention is, while accommodating the above-mentioned constraints, to propose a clamping collar that is capable of providing continuity of bearing against the article that it clamps, while also being capable of withstanding large clamping forces.

This object is achieved by the fact that the setback formed in the inside face of the overlap portion is defined by a first joggle having an end wall that forms two surfaces on either side of the longitudinal midline of the belt, which surfaces are disposed substantially symmetrically about said midline, and are inclined both relative to the longitudinal direction and relative to the transverse direction of the belt, and each of which surfaces extends over a substantial fraction of the half-width of the belt.

In accordance with the invention, the end wall of the joggle that defines the setback, i.e. the inside portion of the joggle that faces the free end of the first end of the plate, has a very particular shape.

The Applicant has observed that by providing this end wall with two surfaces that are inclined relative to the longitudinal direction and to the transverse direction, and by making provision for said surfaces to extend over substantial fractions of the half-width of the belt, it is possible to use the joggle advantageously to stiffen the belt.

Thus, in accordance with the invention, the joggle offers the two functions of providing the setback making it possible to obtain continuity of bearing against the article that is being clamped by the collar, and of locally reinforcing the strip so as to prevent unwanted deformation, under the effect of large clamping forces.

Advantageously, the first end of the plate has two inclined free edges that meet at a tip, the inclination of these two free edges being substantially the same as the inclination of the two surfaces of the end wall of the first joggle.

Thus, the first end of the plate has a shape adapted to match the shape of the end wall of the joggle, so that, when the collar is in the tightened state, the free end of the plate is in the vicinity of said end wall over almost all of its periphery, thereby guaranteeing a significant width of bearing of the belt against the article that is being clamped by the collar in this region.

In addition, as indicated in the introduction, the first end of the plate penetrates into the setback during tightening of the collar. However, the clamping takes place on an article that is constrained to deform radially and that, through the resistance it opposes to the clamping, tends also to oppose penetration of the first end of the plate into the setback. When the forces involved are particularly large, a plate implemented in the form of a narrow tongue like the tongue disclosed in FR 2 522 086 finds it difficult to penetrate into the setback and tends to fold back on itself in the direction opposite from the direction in which it extends, under the effect of the counteracting forces opposed by the article that is being clamped. The Applicant has observed that shaping the first end of the plate with two inclined free edges that meet at a tip makes it possible to limit this phenomenon considerably. The free end of the plate is thus "streamlined" and offers excellent resistance to the forces exerted by the article that is being clamped by the collar and that opposes penetration of said plate.

Advantageously, the second end of the plate is received in an additional setback formed in the inside face of the belt in the vicinity of the second lug, the additional setback being defined by a second joggle also having an end wall that forms two surfaces on either side of the longitudinal midline of the belt, which surfaces are disposed substantially symmetrically about said midline, and are inclined both relative to the longitudinal direction and relative to the transverse direction of the belt, and each of which surfaces extends over a substantial fraction of the half-width of the belt.

The additional setback, which is provided in the vicinity of the second lug of the belt, then also makes it possible, at this place, to stiffen said belt locally. In addition, the second end of the plate is received in this setback and thus offers bearing continuity, thereby enabling the plate to be made in the form of a part that is distinct from the belt, and that is fastened thereto by any suitable means.

Advantageously, the second end of the plate then has two inclined free edges that meet at a tip, the inclination of these two free edges being substantially the same as the inclination of the end wall of the second joggle.

Thus, the second end of the plate also has a shape matching the shape of the end wall of the joggle that defines the additional setback, thereby offering a significant bearing width in this region.

Advantageously, the end wall of the first joggle and/or the end wall of the second joggle is/are substantially V-shaped.

Such a V-shape is particularly simple to implement and offers the above-mentioned advantages. It should be noted that the tip of the V-shape may be implemented in the form of a sharp angle, or else be slightly rounded or flattened.

Advantageously, the second end of the plate is secured to a portion of the belt that carries the second tightening lug.

The plate is then implemented in the form of a part that is distinct from the belt and that is fastened thereto.

Advantageously, the second end of the plate is fastened to the belt by crimping or clinching.

Other modes of fastening, e.g. welding, are also possible, but crimping or clinching offer the advantage of being simple to achieve, without degrading the surface of the material of which the belt is made.

Advantageously, one of the elements constituted by the second end of the plate and by the belt has at least first and second notches situated in respective ones of its longitudinal edges, while the other of said elements has at least first and second projections situated on respective ones of its longitudinal edges and penetrating respectively into the first notch and into the second notch.

Such means for fastening the plate to the belt are particularly simple to achieve, by mechanical operations such as local cutting out, and die-stamping.

Advantageously, the belt is of recessed cross-section, which recessed cross-section is preferably substantially V-shaped.

The invention is applicable particularly advantageously to the field of collars having belts that are of recessed cross-section. Such collars serve, in particular, to interconnect two tubes whose facing ends have bearing projections that penetrate into the recesses formed by the cross-section of the belt. In accordance with the invention, the inclined surfaces of the end wall of the joggle are combined with the recessed cross-section of the collar. Thus, in the region of these surfaces, the material of which the belt is made is deformed both for forming the joggle and for forming the recessed cross-section. In particular, the inclined surfaces of the joggle extend over inclined surfaces of the belt that, between them, define the recessed cross-section of the belt on the inside face thereof. As a result, these surfaces are inclined not only relative to the transverse and longitudinal directions of the belt, but also relative to the radial direction. They can thus affect zones that are large in terms of the amount of material involved, thereby locally providing the belt with a work-hardened zone having a significant area that considerably reinforces its stiffness.

The invention can be well understood and its advantages appear more clearly on reading the following detailed description of embodiments shown by way of non-limiting example. The description refers to the accompanying drawings, in which.

Figure 1:
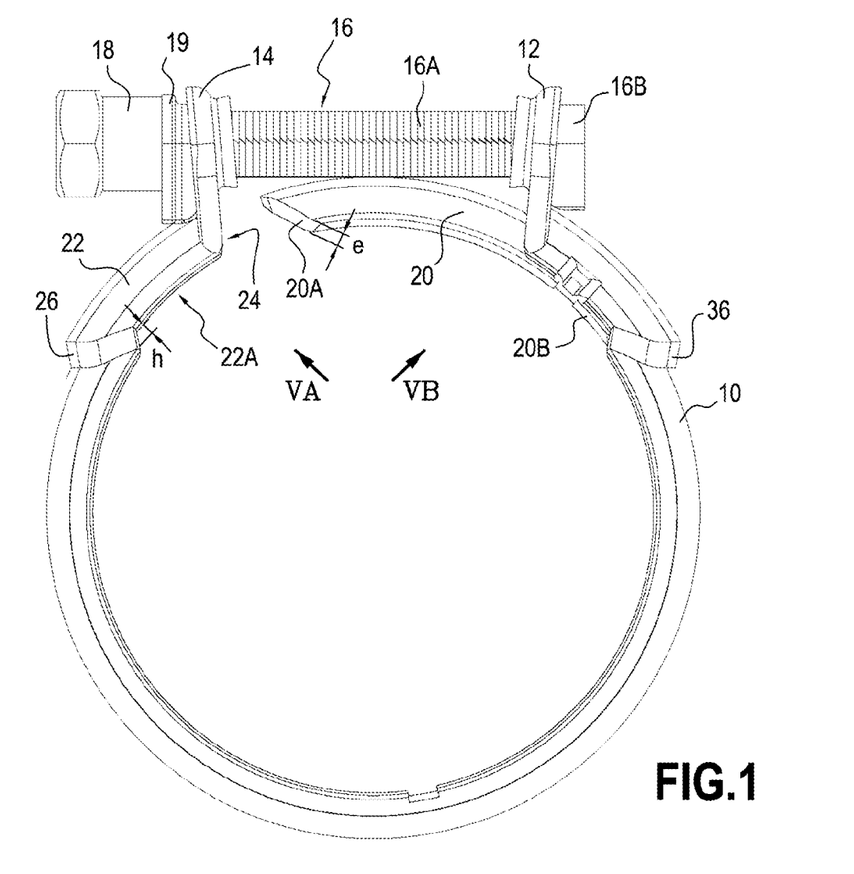
FIG. 1 is a side view of a first embodiment of a clamping collar of the invention.

The clamping collar of FIG. 1 comprises a metal belt 10 and two spaced-apart clamping lugs 12 and 14. In known manner, the lugs are formed by portions of the belt that project radially and that are provided with holes through which the shank 16A of a tightening screw 16 passes, which shank co-operates with screw retainers bearing against the backs of the lugs. In the example shown, these screw retainers are formed firstly by the head 16B of the screw 16 that bears against the back of the lug 12, and secondly by a nut 18 that bears against the back of the lug 14, via a spacing washer 19.

The collar also has a bridging plate 20 that, as can be understood, co-operates with the belt to bridge the gap between the lugs. In FIG. 1, the collar is shown in the non-tightened state, and the first end 20A of the plate is spaced apart slightly from the portion of the belt that faces said first end. In this example, said first end is then situated between the two lugs 12 and 14, in the vicinity of the lug 14. It can be seen that the belt 10 has an overlap portion 22 which, as can be understood, in the tightened state of the collar, serves to overlap the first end 20A of the plate. The inside face 22A of the overlap portion 22 has a setback 24 that can be seen more clearly in FIG. 2, and into which the first end 20A of the plate can penetrate during tightening.

It can be seen that, on the side further from the lug 14, the setback 24 is defined by a joggle 26 that thus forms a substantially radial step in the belt. The height h of the joggle, measured on the inside face of the setback, corresponds substantially to the thickness e of the portion of the metal strip from which the plate 20 is formed. Thus, when the first end 20A of the plate is received in the setback, the inside face of the plate is disposed in continuity with the inside face of the belt.

Figure 2:
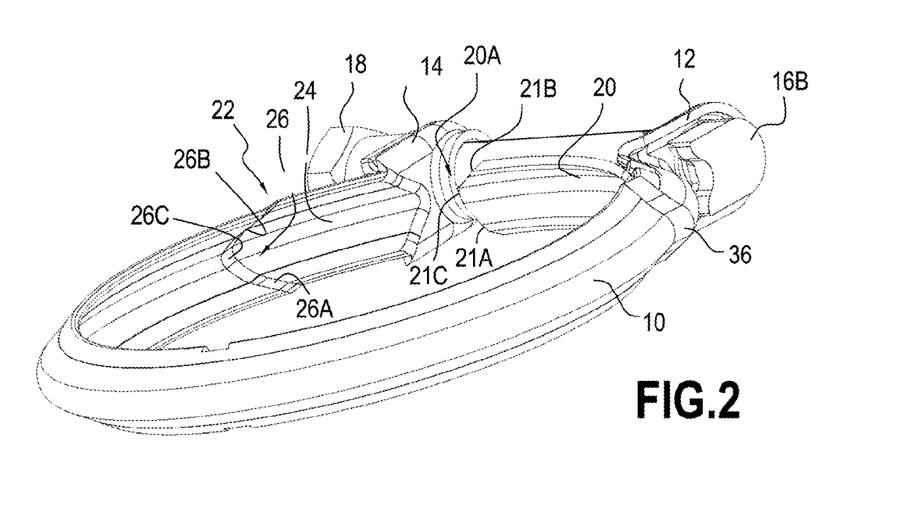
FIG. 2 is a perspective view making it possible, in particular, to see the inside face of the overlap portion and the first end of the plate.
Figure 5A:
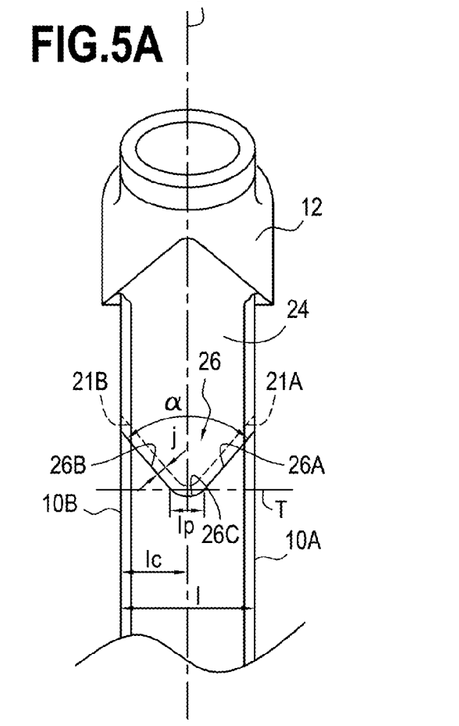
FIGS. 5A and 5B are fragmentary views showing the inside face of the collar, respectively seen looking along arrows VA and VB of FIG. 1.

With reference, in particular, to FIGS. 2 and 5A, it can be understood that the end wall of the joggle 26, i.e. the inside surface of the setback 24 that faces the first end 20A of the plate 20, forms two inclined surfaces, respectively 26A and 26B, on either side of a longitudinal midline of the belt. These two surfaces are disposed substantially symmetrically relative to the midline L of the belt and they are inclined both relative to the longitudinal direction that is the direction of the line L, and also relative to the transverse direction T of the belt.

It can also be seen that each of these two surfaces 26A and 26B extends over a substantial fraction of the half-width lc of the belt 10. In this example, these surfaces 26A and 26B extend from the junction 26C where they meet that is situated on the midline L to the respective longitudinal edges of the belt, respectively 10A and 10B. The phrase "substantial fraction of the half-width of the belt" means all or almost all of said half-width and, in any event, at least one half of said half-width and preferably at least 80% of said half-width.

It can be noted that the end wall of the joggle is symmetrical about the longitudinal midline L.

In this example, the end wall of the joggle 26 is substantially V-shaped, as can be seen particularly clearly in the view from below of FIG. 5A. In this view from below, the above-mentioned surfaces 26A and 26B form the two branches of the V-shape and meet at 26C at the tip of the V-shape. It can be seen that this tip is slightly rounded and thus covers a width lp of about one fifth of the total width l of the belt, as measured in the transverse direction T of the belt.

In the example shown, the branches of the V-shape formed by the surfaces 26A and 26B in FIG. 5A are rectilinear. Without going beyond the ambit of the invention, they may also be slightly curved, as shown in FIG. 5C, respectively by reference 26A' and by reference 26B', symmetry about the line L preferably being preserved.

FIG. 5A shows, indicated by reference α, the internal angle formed between the branches of the V-shape that are formed by the surfaces 26A and 26B. This angle α lies in the range 60° to 90°, and preferably lies in the range 70° to 80°.

Figure 5B:
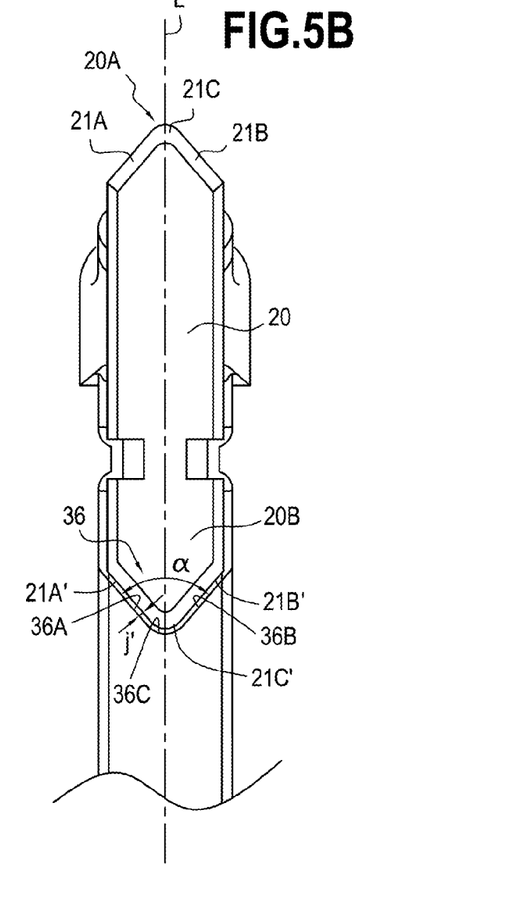
Figure 5C:
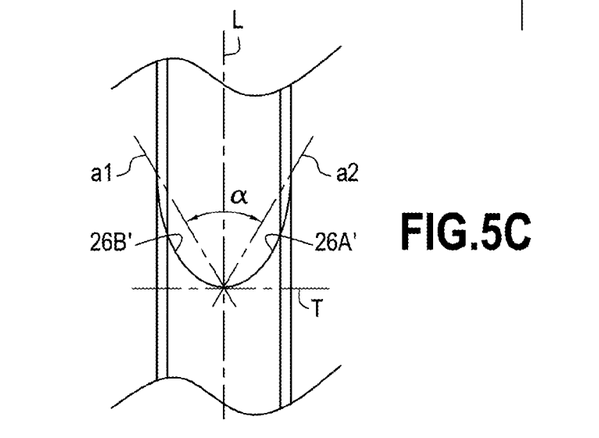
FIG. 5C shows a variant.

Similarly, FIG. 5C shows the internal angle α that is defined between the two lines a1 and a2, each of which is defined by the intersection between the end wall of the joggle and the longitudinal midline L and by a respective one of the ends of the inclined surfaces 26A' and 26B' that are opposite from said intersection. In this figure, the angle α formed between said two lines a1 and a2 that correspond to the angle between the inclined branches of the end wall of the joggle also lies in the range 60° to 90°, and preferably lies in the range 70° to 80°.

FIGS. 2 and 5B show that the first end 20A of the plate 20 has two inclined free edges, respectively 21A and 21B, meeting at a tip 21C that is situated on the longitudinal midline L of the belt. It can also be observed that the inclination of these free edges is substantially the same as the inclination of the two surfaces 26A and 26B of the end wall of the joggle 26.

FIG. 5A shows, in dashed lines, the position of the first end of the plate in the setback 24 when the collar is in the tightened situation. It can be seen that the free edges 21A and 21B of the first end of the plate face respective ones of the surfaces 26A and 26B of the end wall of the joggle. In this example, said free edges are rectilinear as seen from below, but they may also have the same curved shape as the end wall of the joggle that is shown in FIG. 5C.

When the collar is in the tightened state, the free edges of the first end of the plate are situated in the vicinity of the end wall of the joggle and it can be understood that the inside face of the collar bears against the article that is to be clamped by the collar, even in the region of the first end of the plate that is close to the end wall of the joggle. The only slight bearing discontinuity is due to the clearance j between the free end of the plate and the end wall of the joggle. This slight discontinuity does not adversely affect the overall bearing continuity because, if a line transverse to the collar is drawn in the zone of said collar within which said clearance j is observed, that line always crosses the uninterrupted bearing portions that are formed either in the belt, in the vicinity of the end wall of the joggle, or in the plate, said uninterrupted portions representing a clamping width that is almost equal to the width of the belt. In addition, the plate naturally serves to bridge the gap between the lugs 12 and 14. Thus, with its first end engaged in the setback 24, the plate 20 makes it possible to achieve overall continuity of the bearing of the collar against the article that it is clamping.

With reference to FIGS. 1, 3, 4, and 5B, it can be seen that the second end 20B of the plate 20 is received in an additional setback 34 that is formed in the inside face of the belt, in the vicinity of the lug 12. It can also be observed that this additional setback is defined by a second joggle 36, having an end wall that also forms two inclined surfaces, respectively 36A and 36B, on either side of the longitudinal midline L. By comparing these figures with FIGS. 1, 2, and 5A, it can be observed that the joggles that define respectively the setback 24 and the setback 34 are analogous.

Thus, the above description relating to the joggle 26 is also applicable to the joggle 36. In particular, the two surfaces 36A and 36B meet at a tip 36C situated on the longitudinal midline L, and said surfaces may, as seen from below, form rectilinear lines or curved lines.

In addition, the second end 20B of the plate is analogous to its first end 20A and it can be seen, in particular, that it has two free edges, respectively 21B' and 21A' that meet at a tip 21C'. The second end 20B of the plate 20 is thus received in the additional setback 34 and it can be seen, in particular in FIG. 5B, that the inclination of its two free edges 21A' and 21B' corresponds substantially to the inclination of the end wall of the joggle 36, and that the plate is fastened to the belt in such a manner that its free edges come into the immediate vicinities of the surfaces 36A and 36B. The small amount of clearance is thus comparable to the above-mentioned clearance j, and indeed is often smaller than it. In view of the respective shapes of the end wall of the joggle 36 and of the second end of the plate 20, this clearance does not adversely affect the continuity of the bearing of the belt of the collar against the article to be clamped because, if a transverse line is drawn that passes through said clearance, said line always meets uninterrupted portions of the belt or of the plate, these uninterrupted portions representing a clamping width that is almost equal to the width of the belt.

In this first embodiment, the plate is constituted by a separate portion of metal strip that is mounted on and fastened to the belt of the collar. More precisely, the second end 20B of the plate is secured to the portion of the belt that carries the second tightening lug 12.

Figure 4:
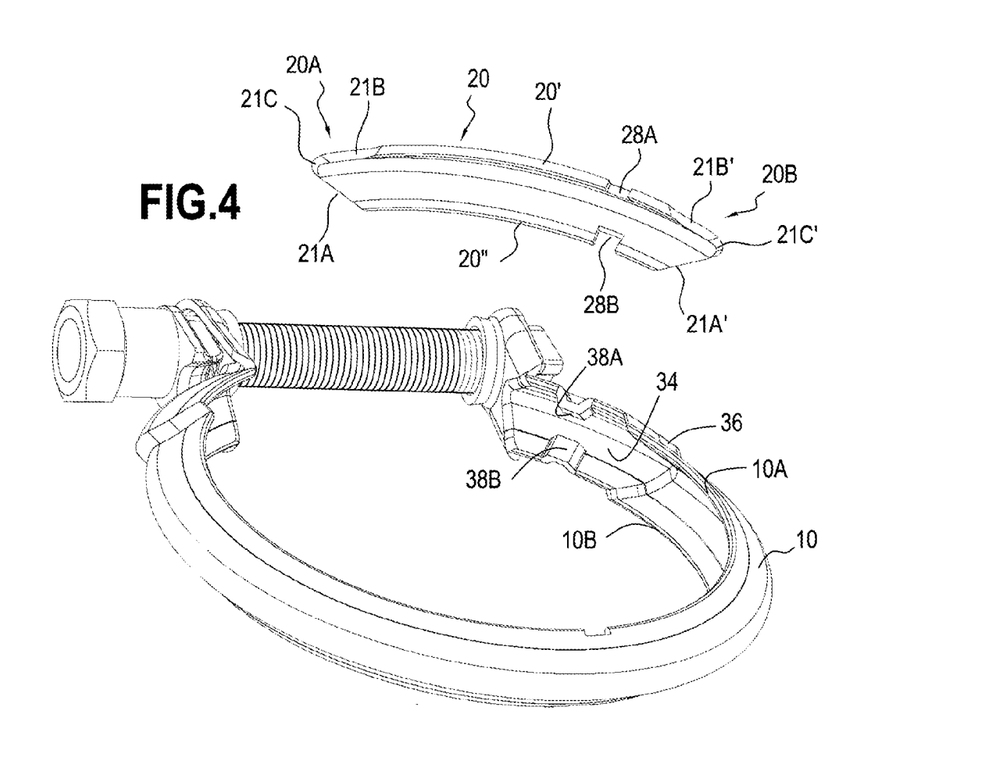
FIG. 4 is an exploded perspective view from the same angle as FIG. 3, but in which the plate is separated from the belt so that it can be seen more clearly.

In this example, the plate is fastened to the belt by fastening that is mechanical only, without any welding or other bonding. With reference, in particular, to FIG. 4, it can be seen that the second end 20B of the plate has two notches, respectively 28A and 28B situated facing away from each other in respective ones of its longitudinal edges 20' and 20". The belt has projections that penetrate into said notches.

Figure 3:
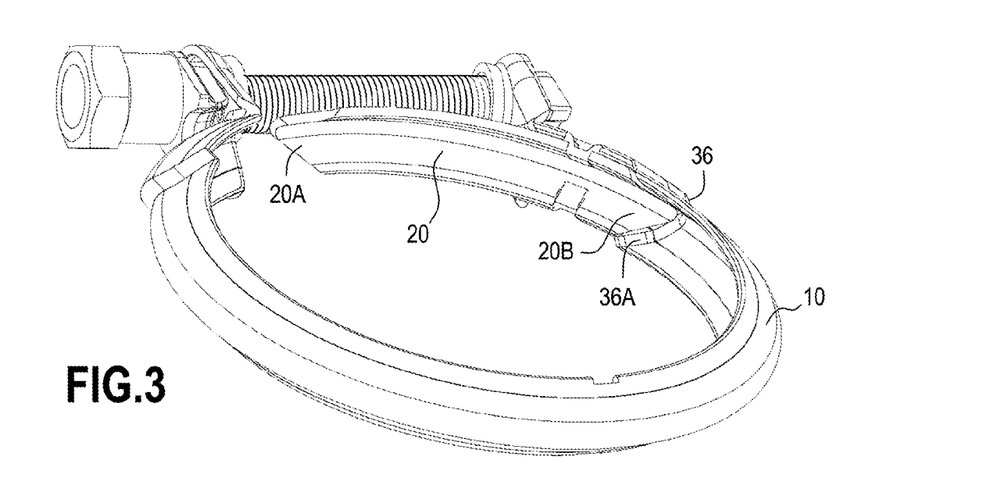
FIG. 3 is also a perspective view making it possible, in particular, to see the inside face of the belt in the region of the second end of the plate.

In this example, it can be seen that these projections are formed by two embossed humps, respectively 38A and 38B, situated on respective ones of the longitudinal edges 10A and 10B of the belt 10. As can be seen in FIG. 3, these embossed humps fit into the notches 28A and 28B. In this example, insofar as the belt and the plate are of recessed cross-section, the longitudinal end walls of the notches 28A and 28B are inclined and are thus retained by the inside edges of the embossed humps 38A and 38B.

The outside face of the plate is thus fully pressed against the inside face of the setback 34 and the plate is thus held relative to the belt. It can be observed that the notches 28A and 28B are formed a small distance from the free end edge of the second end 20B of the plate 20.

Forming projections that penetrate into the notches in the form of embossed humps also facilitates the stiffness of the portion of the collar that carries them, unlike if the projections had cutout edges.

Figure 8:
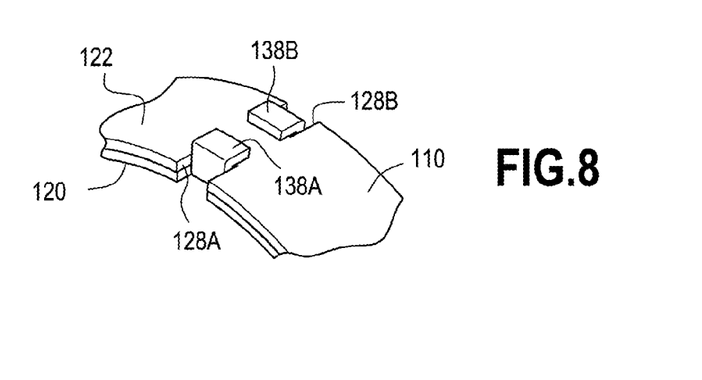
FIG. 8 shows a variant for fastening the plate to the belt.

As shown in the fragmentary perspective view of FIG. 8, it is also possible for the notches 128A, 128B to be formed in the belt 110, and for the projections that penetrate into said notches for holding the plate relative to the belt to be formed in the plate 120. For example, as shown in FIG. 8, these projections may be in the form of catches 138A and 138B that are cut out in the edges of the plate, that are bent back to be radially upstanding, and that are folded over above the plate, beyond the longitudinal edges of the notches 128A and 128B.

The collar of FIGS. 1 to 5B is a collar of recessed inside cross-section. This collar serves in particular to fasten together the ends of two end-to-end tubes having projecting flanges that penetrate into the recessed cross-section of the collar. It can be observed that the recessed cross-section is substantially V-shaped, which is particularly suitable when the bearing faces of the collars of the tubes are inclined relative to the axial direction of the tubes so as to form frustoconical surfaces.

As indicated in the introductory part of the present application, forming the end wall(s) of the joggle(s) of the belt with surfaces that are inclined, in particular with V-shaped surfaces, is particularly advantageous for collars having such recessed cross-sections. The work-hardening that takes place in the region of the joggles is then of particularly large magnitude and affects a relatively substantial quantity of material, so that the stiffness of the belt is particularly reinforced.

Figure 6:
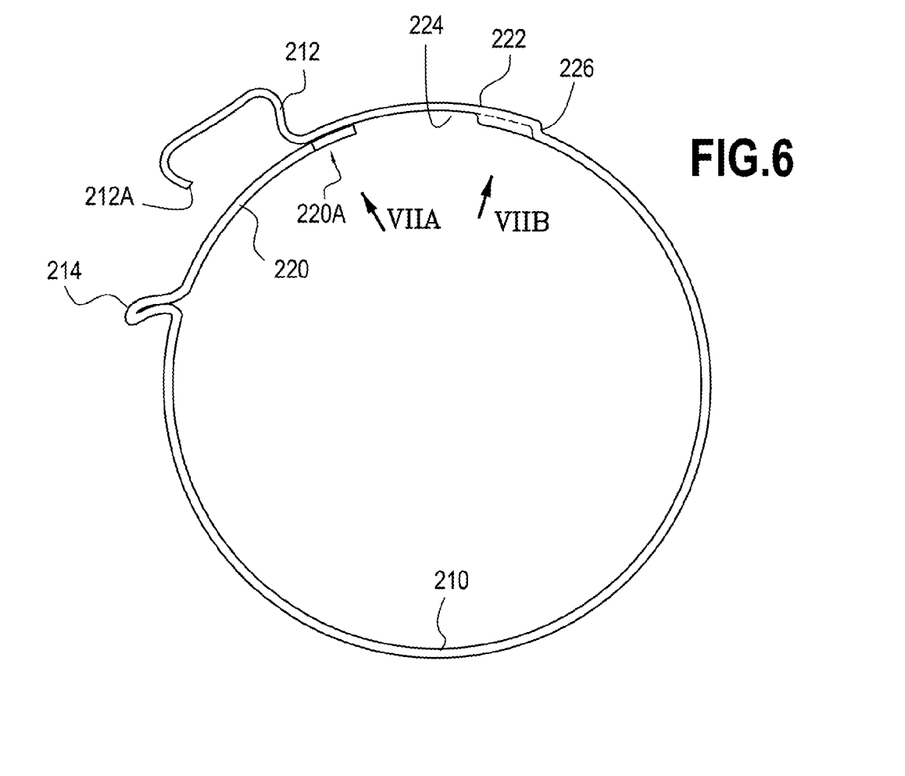
FIG. 6 is a side view of a second embodiment of a clamping collar of the invention.
Figure 7A:
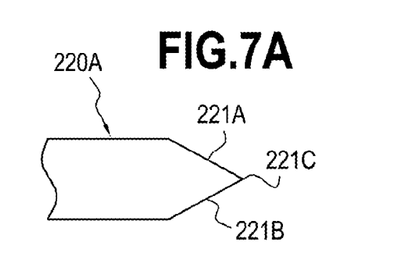
FIGS. 7A and 7B show the inside face of the collar, respectively seen looking along arrows VIIA and VIIB of FIG. 6.
Figure 7B:
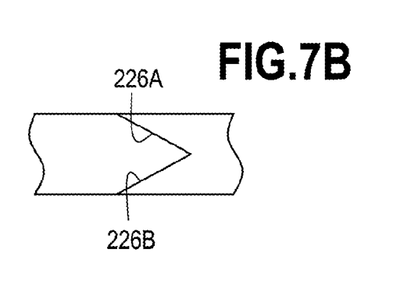

The invention is also applicable to a collar in which the belt is of flat cross-section, as shown in FIGS. 6 to 7B.

The collar shown in FIG. 6 comprises a belt 210 of flat cross-section and tightening lugs 212 and 214. In this example, the tightening takes place by hooking, and the lugs comprise a first lug 212 in the form of a hook and a second lug 214 in the form of a fold that extends radially outwards. It can be understood that, for tightening the collar, the edge 212A of the hook comes to hook behind the lug 214. Naturally, these tightening means are given merely by way of example, it being possible for the tightening to take place, for example, by screw-tightening, as in the preceding figures and as shown in FR 2 522 086.

In this example, the collar is made in one piece and it can be seen that the plate 220 is formed by an extension to the belt, beyond the fold 214. When the collar is tightened, this plate comes to be received in the setback 224 formed in the overlap portion situated behind the hook 212. This setback 224 is defined by a joggle 226 in which it can be understood, with reference particularly to FIG. 7B, that its end wall has two inclined surfaces, respectively 226A and 226B. In this example, it is V-shaped, the two inclined surfaces forming the two branches of a V-shape as seen from below. When the collar is tightened, the first end 220A of the plate 220 penetrates into the setback 224 until it comes into the vicinity of the end wall of the joggle 226. As can be seen in FIG. 7A, this first end 220A has two inclined free edges, respectively 221A and 221B, meeting at a tip 221C. They have substantially the same inclination as the end wall of the joggle 226.

The joggle 226 may be analogous to the above-mentioned joggles 26 and 36, except that it is formed in a flat strip, i.e. in a strip that is not of recessed cross-section. This means that, as seen from below, i.e. from the inside of the strip, the joggle 226 can have the same shape as the joggles 26 and 36. In particular, it may have a V-shape as shown in FIG. 7B, or indeed a shape similar to a V-shape but in which the two branches are curved, so as to form an upside-down parabola, as shown in FIG. 5C. Similarly, the end 220A of the plate 220 may have the same shape as the first end of the above-described plate 20, except that it is of flat cross-section.

The end wall of the joggle 226 is preferably symmetrical about the longitudinal midline of the belt. The same applies for the plate 220 and, in particular for its end 220A.

The invention claimed is:

1. A clamping collar, comprising:
    a metal belt;
    two spaced-apart tightening lugs connected to the metal belt and suitable for being brought towards each other in order to tighten the clamping collar; and
    a bridging plate that co-operates with the metal belt to bridge a gap between the tightening lugs,
    the metal belt including an overlap portion that carries a first tightening lug of the two tightening lugs,
    said overlap portion including an inside face provided with a setback, wherein a first end of the bridging plate is disposed in said setback during tightening of the clamping collar, and
    said setback being defined by a first joggle having an end wall that forms two surfaces on either side of a longitudinal midline of the metal belt, wherein said two surfaces are disposed substantially symmetrically about said longitudinal midline, and said two surfaces are inclined both relative to a longitudinal direction and relative to a transverse direction of the metal belt, and each of said two surfaces extends over a substantial fraction of half-width of the metal belt.

2. The clamping collar according to claim 1, wherein the first end of the bridging plate has two inclined free edges that meet at a tip, the inclination of these two free edges being substantially the same as the inclination of the two surfaces of the end wall of the first joggle.

3. The clamping collar according to claim 1, wherein the bridging plate has a second end which is received in an additional setback formed in the inside face of the metal belt in the vicinity of a second tightening lug of the two tightening lugs, the additional setback being defined by a second joggle having an end wall that forms two surfaces on either side of the longitudinal midline of the metal belt, each of said two surfaces of the end wall of the second joggle being disposed substantially symmetrically about said longitudinal midline, and said two surfaces of the end wall of the second joggle are inclined both relative to the longitudinal direction and relative to the transverse direction of the metal belt, and each of said two surfaces of the end wall of the second joggle extends over a substantial fraction of the half-width of the metal belt.

4. The clamping collar according to claim 3, wherein the second end of the bridging plate has two inclined free edges that meet at a tip, the inclination of these two free edges being substantially the same as the inclination of the end wall of the second joggle.

5. The collar according to claim 1, wherein the end wall of the first joggle is substantially V-shaped.

6. The clamping collar according to claim 3, wherein the end wall of the second joggle is substantially V-shaped.

7. The clamping collar according to claim 5, wherein the V-shape has branches defining a V between them, said branches form an internal angle between them that lies in the range 60° to 90°.

8. The clamping collar according to claim 1, wherein the bridging plate has a second end which is secured to a portion of the metal belt that carries the second tightening lug.

9. The clamping collar according to claim 8, wherein the second end of the bridging plate includes a crimped or clinched portion that is fastened to the metal belt.

10. The clamping collar according to claim 8, wherein a first one of the elements constituted by the second end of the bridging plate and by the metal belt has at least first and second notches situated in respective ones of the longitudinal edges of said first element, while the second one of said elements has at least first and second projections situated on respective ones of the longitudinal edges of said second element and penetrating respectively into the first notch and into the second notch.

11. The clamping collar according to claim 10, wherein the second end of the bridging plate has at least first and second notches situated in respective ones of its longitudinal edges, while the inside face of the metal belt has at least first and second embossed humps on respective ones of the longitudinal edges of the metal belt and penetrating into respective ones of the first and second notches.

12. The clamping collar according to claim 1, wherein the tightening lugs are formed by portions of the metal belt that project radially and that are provided with holes through which a shank of a tightening screw passes, which shank co-operates with screw retainers bearing against the backs of the lugs.

13. The clamping collar according to claim 1, wherein the metal belt is of substantially recessed cross-section.

14. The clamping collar according to claim 13, wherein the recessed cross-section is substantially V-shaped.

15. The A clamping collar according to claim 1, wherein each of said two surfaces extends over at least 80% of the half-width of the metal belt.

16. A clamping collar, comprising:
a metal belt;
two spaced-apart tightening lugs connected to the metal belt and suitable for being brought towards each other in order to tighten the clamping collar; and
a bridging plate that co-operates with the metal belt to bridge a gap between the tightening lugs,
the metal belt including an overlap portion that carries a first tightening lug of the two tightening lugs, wherein an inside face of the overlap portion includes a setback, wherein a first end of the bridging plate is disposed in said setback during tightening of the clamping collar, said setback being defined by a first joggle having a substantially V-shaped end wall that forms two surfaces on either side of a longitudinal midline of the metal belt, wherein said two surfaces are disposed substantially symmetrically about said longitudinal midline, and said two surfaces are inclined both relative to a longitudinal direction and relative to a transverse direction of the metal belt.

17. The clamping collar according to claim 16, wherein each of said two surfaces extends over at least 80% of the half-width of the metal belt.

18. The clamping collar according to claim 16, wherein the bridging plate has a second end which is received in an additional setback formed in the inside face of the metal belt in the vicinity of the second lug, the additional setback being defined by a second joggle also having a substantially V-shaped end wall that forms two surfaces on either side of the longitudinal midline of the metal belt, which surfaces are disposed substantially symmetrically about said midline, and are inclined both relative to the longitudinal direction and relative to the transverse direction of the metal belt.

19. The clamping collar according to claim 16, wherein the metal belt is of substantially recessed cross-section.

20. The clamping collar according to claim 19, wherein the recessed cross-section is substantially V-shaped.

21. The clamping collar according to claim 5, wherein the V-shape has branches defining a V between them, said branches form an internal angle between them that lies in the range 70° to 80°.

* * * * *